Aug. 4, 1931.                M. M. BROCKWAY                1,817,028
                      FOUR-WHEEL REAR DRIVE CHASSIS
                  Filed March 7, 1927        3 Sheets-Sheet 1
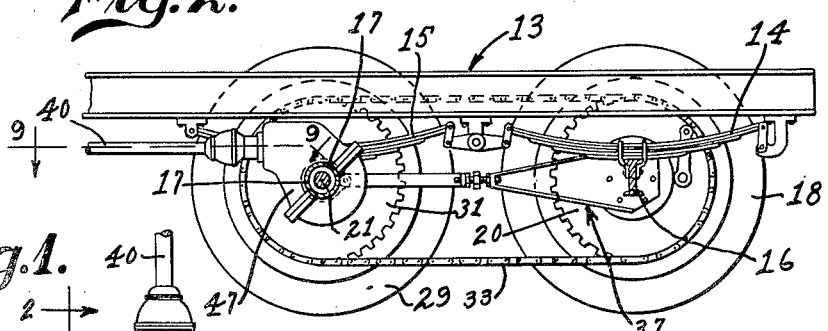
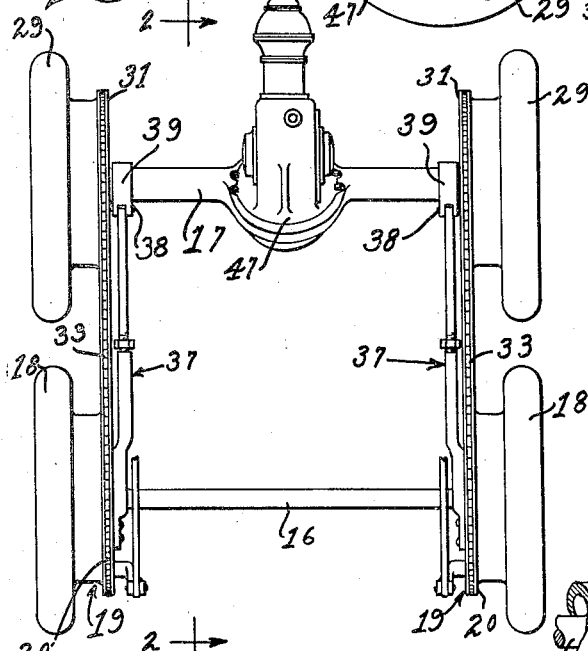
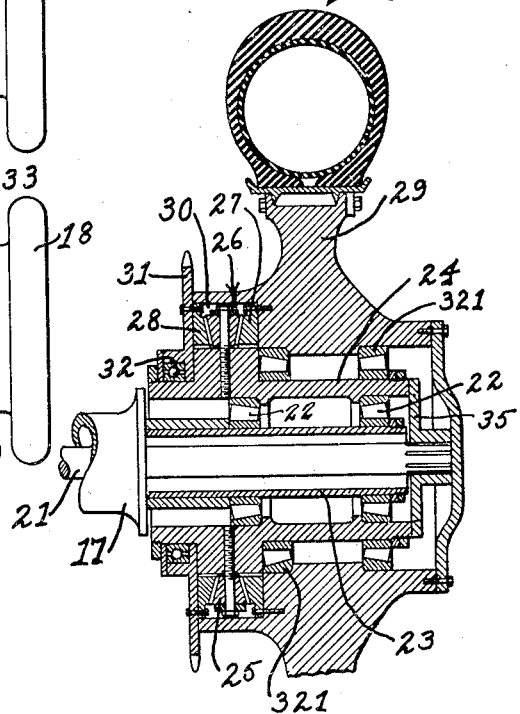
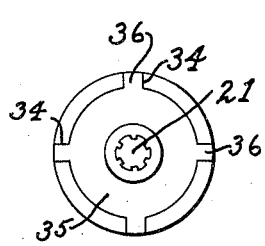
Inventor
Murillo M. Brockway
By Lyon+Lyon
Attorneys Aug. 4, 1931.  M. M. BROCKWAY  1,817,028
FOUR-WHEEL REAR DRIVE CHASSIS
Filed March 7, 1927  3 Sheets-Sheet 2
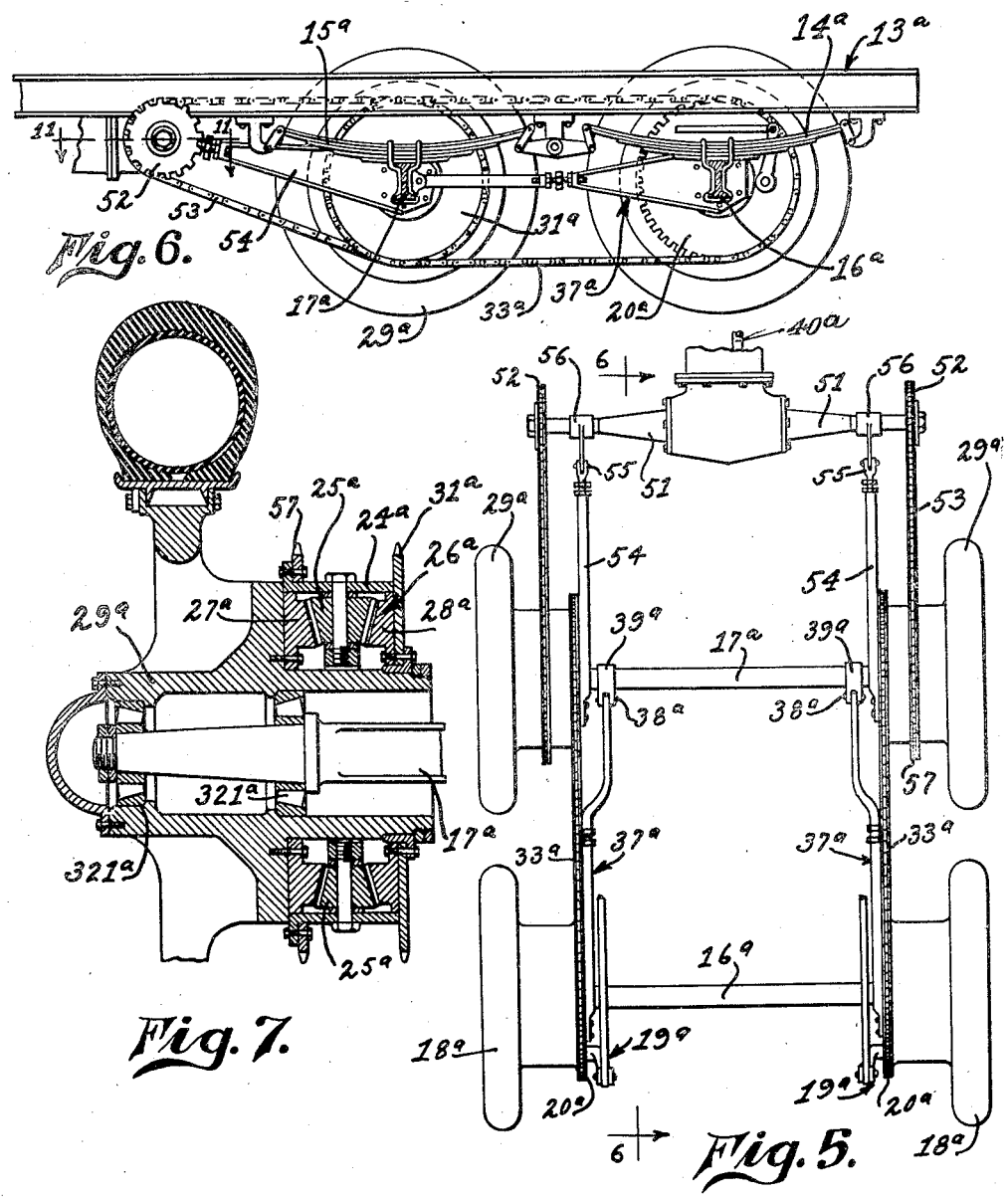

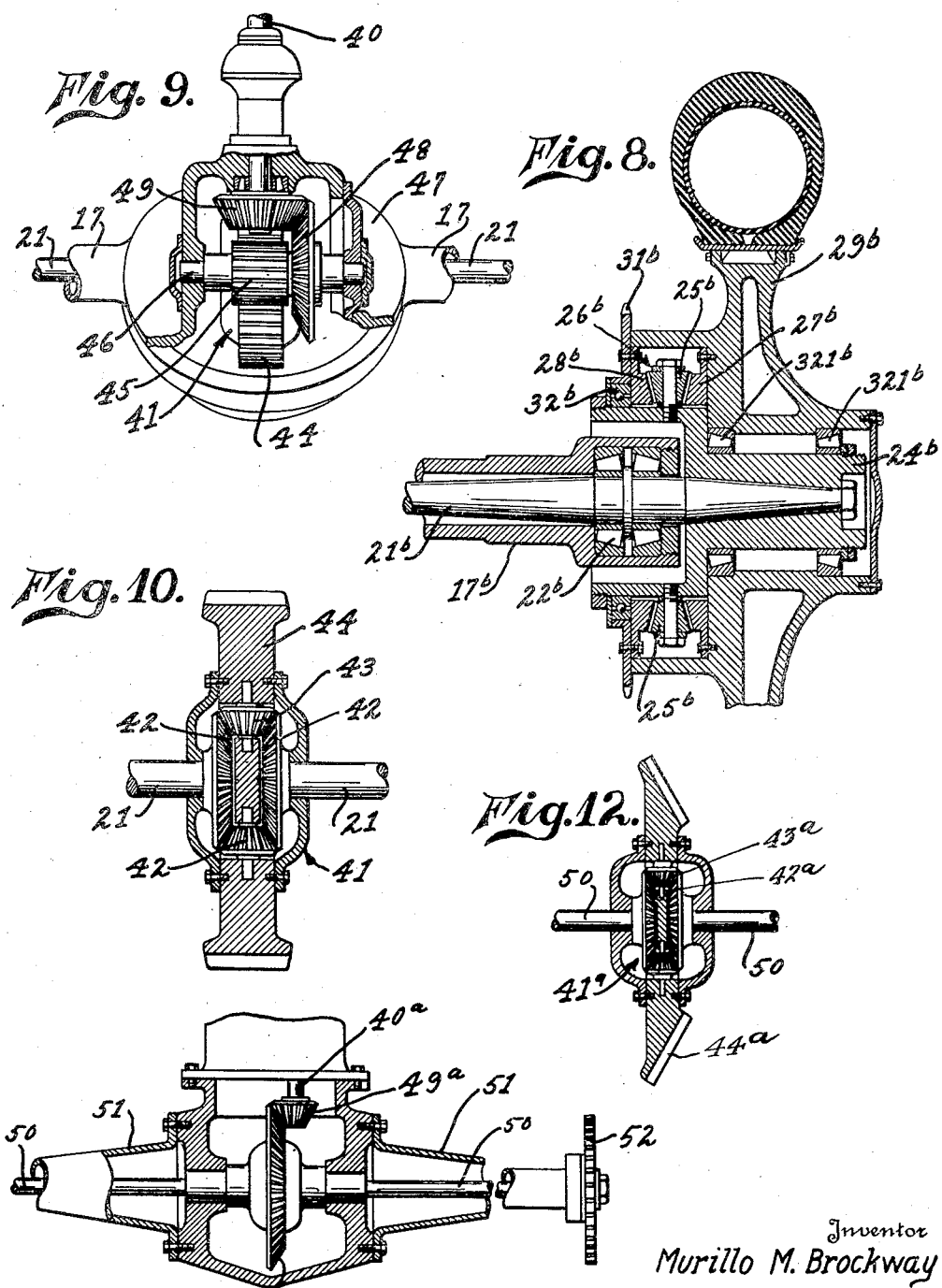

Patented Aug. 4, 1931

1,817,028

UNITED STATES PATENT OFFICE

MURILLO M. BROCKWAY, OF BURBANK, CALIFORNIA

FOUR-WHEEL REAR DRIVE CHASSIS

Application filed March 7, 1927. Serial No. 173,295.

This invention relates to a chassis of the type employing dirigibly mounted wheels at one end and two pairs of drive wheels at the other end for effecting driving of the chassis.

There have been a large number of the six-wheel type of chassis proposed and some of them are in use. Many of these prior six-wheel chasses have but two of the wheels driven, whereas others have four wheels driven. The four-wheel drive is, of course, preferable because of the greater effective tractive effort that it can exert. More or less difficulty has been experienced in constructing a four-wheel drive chassis because the power must be delivered to each pair of drive wheels mounted in a manner to be free to move vertically with respect to the other pair of drive wheels, since the chassis does not at all times run along a plane surface and the drive wheels must accommodate themselves to the grades and inequalities of the roadways.

An object of the invention is simplicity of construction.

A very important object is to provide a construction that can be readily used in the form of an attachment to existing chasses.

A further object is to provide an attachment that, without alteration of the drive on existing two-wheel drive trucks, will convert the two-wheel drive into a four-wheel drive.

A further object of the invention is to adapt the four-wheel drive to various types of existing two-wheel drives.

Still further objects and advantages will appear in the subjoined detailed description.

The accompanying drawings illustrate several different forms in which the invention may be embodied.

Figure 1 is a fragmental plan view of a chassis constructed in accordance with the provisions of this invention.

Figure 2 is an elevation, partly in section, from the line indicated by 2—2, Figure 1.

Figure 3 is an enlarged fragmental section of one of the differential drive wheels.

Figure 4 is an end view of the pinion support and its driving flange.

Figure 5 is a fragmental plan view of the chassis embodying the invention in a different form.

Figure 6 is an elevation of Figure 5, partly in section, from the line indicated by 6—6, Figure 5.

Figure 7 is an enlarged fragmental section of one of the differential drive wheels shown in Figures 5 and 6.

Figure 8 is an enlarged fragmental section of a modified form of differential drive wheel.

Figure 9 is an enlarged plan view, partly in section, from the line indicated by 9—9, Figure 2.

Figure 10 is an enlarged detail, partly in section, of the differential gearing in Figure 9.

Figure 11 is an enlarged broken plan view, partly in section, from the line indicated by 11—11, Figure 6.

Figure 12 is an enlarged section of the differential gearing in Figure 11.

First referring to Figures 1 to 4 inclusive, 9 and 10 for the form of the invention illustrated thereby, there is provided a chassis frame 13 of any suitable construction. The frame 13 is resiliently carried by springs 14, 15. The springs 14 are mounted on a support 16 and the springs 15 are mounted on a support 17. In this instance, the support 16 is a dead axle having rotatably mounted on its opposite ends drive wheels 18 of any suitable construction. Any suitable form of brakes 19 are provided for the wheels 18 and said brakes are not illustrated nor described in detail herein, since their construction is well understood in the art relating to motor vehicles. Each of the wheels 18 is provided with a sprocket wheel 20 for driving said wheel.

The support 17, in this instance, constitutes the tubular housing for a full floating axle 21 and rotatably mounted by bearings 22 on each of the end portions 23 of the support 17 is a tubular pinion support 24 on which are rotatably mounted bevel pinions 25 that constitute elements of a differential gearing indicated in general by the character 26. The other elements of each differential gearing 26 are bevel gears 27, 28. The gear 27 is fixed to a wheel 29 and the differential gearing is housed in a chamber 30 provided in said wheel. The gear 28 is fixed to a sprocket wheel 31 which is rotatably mounted by a bearing 32 on the pinion support 24.

It will be readily understood that each of the wheels 29 is provided with differential gearing and that there is a sprocket wheel 31 to drive each of the differential gearings. Each of the wheels 29 is rotatably mounted by bearings 321 on one of the pinion supports 24. The sprocket wheels 31 drive the sprocket chains 33 which, in turn, drive the sprocket wheels 20.

The pinion support 24 is suitably connected to the floating axle 21 and, in this instance, the construction for effecting the connection comprises recesses 34, in the outer end of each of the pinion supports 24, and a driving flange 35 having fingers 36 engaging in the recesses 34. The driving flanges 35 are keyed or otherwise secured to the axle 21.

Radius rods 37 are secured at one end to the brake drum flanges, and are pivoted at 38 at their opposite ends to collars 39 which are shrunk on or otherwise secured to the support 17. The floating axle 21, as is customary, is in two sections and the sections are driven by a propeller shaft 40 through a differential gearing, indicated in general by the character 41. Although the differential gearing 41 illustrated in figure 9 is of the double reduction type, it will be readily understood that either this type, or the worm, bevel gear, or internal gear drive type may be employed instead of the double reduction type. The differential gearing 41 comprises gears 42 fixed to the axle 21, and pinions 43 in mesh with the gears 42 and rotatably mounted in the spur gear 44. The spur gear 44 meshes with a spur pinion 45 mounted on a shaft 46 which is carried by the differential housing 47. The shaft 46 is provided with a bevel gear 48 in mesh with a bevel pinion 49 on the propeller shaft 40.

The operation of the form of invention described above will be obvious and, is as follows: The propeller shaft 40 being driven by the motor, not shown, of the vehicle, operates the axle 21 through the differential gearing 41 and the axle 21 drives each of the differential gearings 26. Thus, the differential gearing 41 takes care of the difference in speeds between the wheel hubs 29 and the differential gearings 26 take care of any differences in speed between the wheel hubs 29 and wheels 18.

Each of the hubs 29 and the mechanism connecting said hub to the axle 21 is herein designated by the term "differential wheel". The form of the invention above described is suitable for use, as is readily understood, with a shaft drive. To convert an existing two-wheel drive chassis into a four-wheel drive, by the use of this invention, the wheels with which the full floating axle is equipped will be removed and the differential wheels will be substituted therefor. The wheels thus removed will be mounted on the axle 16 and the sprocket wheels 20, 31 will be connected by the sprocket chains 33.

In the drawings the wheels 18 are shown positioned behind the differential wheels. But it is readily understood that the wheels 18 may be positioned in front of the differential wheels when closer coupling is desired.

Now referring more particularly to Figures 5, 6, 7, 11 and 12 for the form of the invention illustrated thereby, the elements that functionally correspond to those described above are indicated by the same reference characters with the addition of the letter a. The invention is modified so that it can be used with a chain drive. The propeller shaft is indicated at 40a and carries a pinion 49a which drives a gear 44a. The gear 44a drives, through differential gearing 41a, a jack shaft 50 which turns within a housing 51. The jack shaft 50 is provided at its opposite ends with sprocket wheels 52 which drive sprocket chains 53. To the support 17a are secured the rear ends of the radius rods 54 which are pivoted at 55 at their forward ends to collars 56 shrunk on or otherwise secured to the housing 51. In this instance, the support 17a is a dead axle and each of the wheel hubs 29a is rotatably mounted by bearings 321a on said axle 17a. A pinion support 24a is rotatably mounted on the wheel 29a and is driven by a sprocket wheel 57 mounted thereon. The sprocket wheels 57 are driven by the sprocket chains 53. Rotatably mounted within the pinion support 24a, which is tubular, are bevel pinions 25a which constitute elements of a differential gearing indicated in general by the character 26a. The other elements of the differential gearing 26a are gears 27a, 28a.

The gear 27a is fixed to the wheel hub 29a, and the gear 28a is fixed to a sprocket wheel 31a.

Only one of the wheels 29a and the elements associated therewith for driving the same have been described above, but it is to be understood that such wheel and driving elements are provided in duplicate, one set on each end of the axle 17a. The sprocket wheels 31a drive sprocket chains 33a which, in turn drive sprocket wheels 20a secured to the wheels 18a. Excepting as above described, the construction illustrated in Figures 5, 6 and 7 is the same as that illustrated in Figures 1 to 3 inclusive.

The form of the invention illustrated in Figures 5 to 7 operates as follows: The propeller shaft 40a operates the jack shaft 50 thus turning the sprocket wheels 52. Driving of the sprocket wheels 52 operates the pinion supports 24a, which through the differential gearings 26a operates the wheels 29a and the sprocket wheels 31a. Any differences in speed between the wheels 29a is compensated by the differential gearing 41a. Rotation of the sprocket wheels 31a causes operation of the wheels 18a and any difference in speed between the wheels 18a is compensated by the differential gearings 26a.

The differential wheel illustrated in Figure 8 will now be described, said wheel being intended to be driven through differential gearing the same as described for the form of invention illustrated in Figures 1 to 4 inclusive. The differences in construction between the differential wheel illustrated in Figure 8 and that illustrated in Figure 3 result from the difference in the method of driving the differential wheel. In Figure 3 the type of axle that drives the differential wheel is what is termed "full floating", whereas in Figure 8 the type of axle employed is termed "live" or "semi-floating". In describing the differential wheel illustrated in Figure 8, the elements that functionally correspond with those described above in connection with Figure 3 are indicated by the same reference characters with the addition of the letter b. In this instance, the pinion support 24b is mounted directly upon the axle 21b and the wheel hub 29b is rotatably mounted by bearings 321b upon the pinion support 24b. Rotatably mounted upon the pinion support 24b are pinions 25b which constitute elements of the differential gearing 26b. The pinions 25b mesh with gears 27b, 28b. The gear 27b is fixed to the axle hub 29b and the gear 28b is fixed to a sprocket wheel 31b. The axle 21b rotates in bearings 22b carried by the support 17b, which, in this instance, is the tubular housing that partly encloses the axle 21b.

The description of the operation of the form of the invention shown in Figures 1 to 3 will make clear how the operation takes place when a semi-floating axle is employed in place of the full floating axle 21 and differential wheels like that illustrated in Figure 8 are substituted for the type illustrated in Figure 3. The axle 21b drives the pinion support 24b and this, through the differential gearing 26b, drives the wheel 29b and sprocket wheel 31b. It is to be understood that the axle 21b is driven by mechanism similar to that used in driving the axle 21, said mechanism not being described in detail and illustrated because it has already been described in connection with the form of the invention illustrated in Figures 1 to 3.

From the foregoing, it will be seen that the different forms of the invention have in common differential wheels carrying sprocket wheels, and other wheels carrying sprocket wheels which are connected by sprocket chains to the first mentioned sprocket wheels. When it is desired to apply the invention to an existing chassis provided with a full floating drive axle, the differential wheels of the type illustrated in Figure 3 will be employed. If the existing chassis, to which the invention is to be applied, has a semi-floating or live axle, wheels of the type illustrated in Figure 8 will be employed. Furthermore, if an existing chassis, to which the invention is to be applied, has a dead axle on which the drive wheels are mounted, differential wheels of the type illustrated in Figure 7 will be used. In any event, the drive wheels already present in existing chassis will be removed from their axles and placed on dead axles and differential wheels will be substituted in their place.

I claim:

1. A four-wheel drive chassis comprising a frame, supports, means connecting the supports with the frame, differential wheels connected with one of the supports, each of said differential wheels including a differential gearing operably associated with the hub of said wheel to effect driving of said wheel, other wheels mounted on the other support, a third differential gearing, driving connections between the differential gearing and the differential gearings of said differential wheels, and driving connections between the respective differential gearings of said differential wheels and said other wheels.

2. A four-wheel drive chassis comprising a frame, supports, means connecting the supports with the frame, differential wheels connected with one of the supports and each provided with a sprocket wheel driven by the differential of the wheel, other wheels mounted on the other support and each provided with a sprocket wheel, sprocket chains connecting the first and second mentioned sprocket wheels, a differential gearing, and driving connections between the differential gearing and the differentials of the wheels.

3. A four-wheel drive chassis comprising a frame, supports, means connecting the supports with the frame, drive wheels connected with one of the supports, differential gearing, pinion supports, driving connections between the differential gearing and the pinion supports, pinions rotatably mounted on the pinion supports, gears meshing with the pinions and fixed to the wheels, other gears meshing with the pinions, sprocket wheels fixed to the last mentioned gears, drive wheels mounted on the other frame support, sprocket wheels on said last mentioned drive wheels, and sprocket chains connecting the first mentioned sprocket wheels to the last mentioned sprocket wheels.

4. A four-wheel drive chassis comprising a frame, an axle housing, means connecting the axle housing to the frame, differential gearing supported by said housing, an axle in the housing driven by the differential gearing, pinion supports rotatably mounted on the axle housing, driving connections between the axle and the pinion supports, drive wheels rotatably mounted on the pinion supports, pinions rotatably mounted on the pinion supports, gears meshing with the pinions and fixed to the wheels, other gears meshing with the pinions, sprocket wheels fixed to the last mentioned gears, a dead axle, means connecting the dead axle to the frame, drive wheels rotatably mounted on the dead axle, sprocket wheels fixed to the last mentioned drive wheels, and sprocket chains connecting the first mentioned sprocket wheels to the last mentioned sprocket wheels.

5. A four-wheel drive chassis comprising a frame, an axle housing, means connecting the axle housing to the frame, differential gearing supported by said housing, an axle journaled in the housing and driven by the differential gearing, pinion supports fixed to the axle, drive wheels rotatably mounted on the pinion supports, pinions rotatably mounted on the pinion supports, gears meshing with the pinions and fixed to the drive wheels, other gears meshing with the pinions, sprocket wheels fixed to the last mentioned gears, a dead axle, means connecting the dead axle to the frame, drive wheels rotatably mounted on the dead axle, sprocket wheels fixed to the last mentioned drive wheels, and sprocket chains connecting the first mentioned sprocket wheels to the last mentioned sprocket wheels.

6. A four-wheel drive chassis comprising a frame, an axle housing, means connecting the axle housing to the frame, differential gearing supported by said housing, an axle in the housing driven by the differential gearing, pinion supports connected with the axle, drive wheels rotatably mounted on the pinion supports, pinions rotatably mounted on the pinion supports, gears meshing with the pinions and fixed to the wheels, other gears meshing with the pinions, sprocket wheels fixed to the last mentioned gears, a dead axle, means connecting the dead axle to the frame, drive wheels rotatably mounted on the dead axle, sprocket wheels fixed to the last mentioned drive wheels, and sprocket chains connecting the first mentioned sprocket wheels to the last mentioned sprocket wheels.

7. An attachment of the character described comprising a pinion support, pinions rotatably mounted on said support, a means to transmit power to the pinion support to turn it, gear wheels in mesh with the pinions, a grooved wheel fixed to one of said gear wheels and rotatably mounted relative to the pinion support, a tire in the groove of the grooved wheel for traction purposes, and a rotatably mounted sprocket fixed to the other gear wheel.

Signed at Los Angeles, Calif., this 7th day of February, 1927.

MURILLO M. BROCKWAY.